United States Patent

[11] 3,611,112

| [72] | Inventor | Richard N. Lehinhoff<br>Dayton, Ohio |
|---|---|---|
| [21] | Appl. No. | 872,856 |
| [22] | Filed | Oct. 31, 1969 |
| [45] | Patented | Oct. 5, 1971 |
| [73] | Assignee | General Motors Corporation,<br>Detroit, Mich. |

[54] SOLID-STATE ALTERNATOR STATIC BUILDUP CIRCUIT
4 Claims, 1 Drawing Fig.

[52] U.S. Cl. .................................................. 322/28,
322/60, 322/73
[51] Int. Cl. ..................................................... H02p 9/08,
H02d 9/30
[50] Field of Search ........................................ 322/28, 60, 73

[56] References Cited
UNITED STATES PATENTS
3,378,753 4/1968 Poppinger et al. ............. 322/60 X
3,403,315 9/1968 Maynard ....................... 318/345 X

*Primary Examiner*—Oris L. Rader
*Assistant Examiner*—H. Huberfeld
*Attorneys*—Eugene W. Christen, Creighton R. Meland and Richard G. Stahr

ABSTRACT: A solid-state alternator static buildup circuit. At least one output phase of an alternating current alternator is rectified and applied across the base-emitter junction of a transistor and the exciter shunt field winding through the current-carrying electrodes of a series transistor. With low alternator output potential, the transistor conducts through the current-carrying electrodes to complete an auxiliary exciter shunt field winding excitation circuit. When the alternator output reaches a predetermined magnitude, a potential-sensitive bilateral switch, connected across the control electrode and one of the current-carrying electrodes of the transistor, conducts and extinguishes the transistor to interrupt the auxiliary energizing circuit.

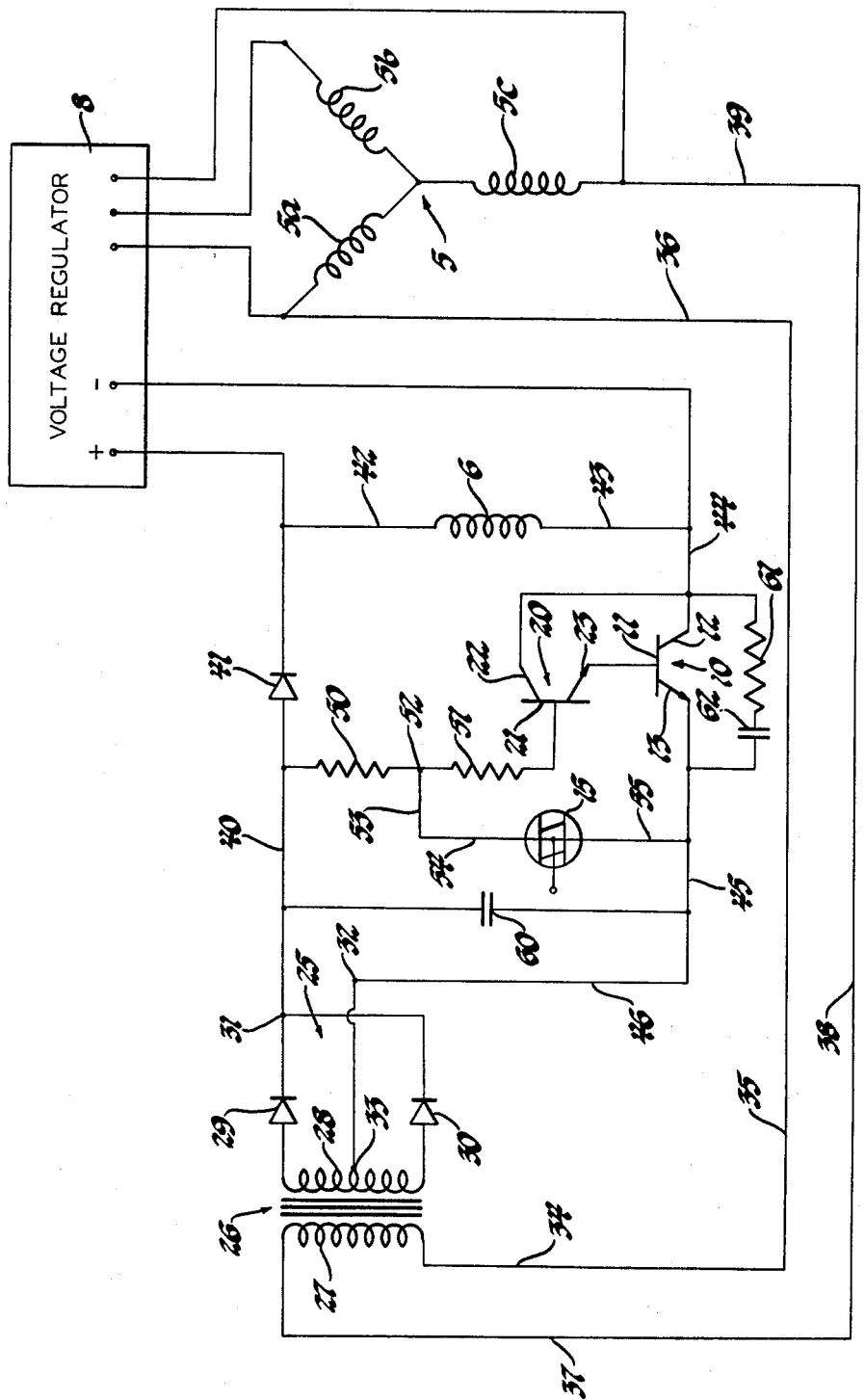

SOLID-STATE ALTERNATOR STATIC BUILDUP CIRCUIT

This invention is directed to an alternator static buildup circuit and, more specifically, to a circuit of this type employing all solid-state components.

The potential buildup of an alternating current alternator from the residual magnetism of the exciter field iron is obtained through a normally closed electromechanical relay which completes an auxiliary energizing circuit for the flow of alternator current through the excitor shunt field during buildup. When the alternator output potential reaches a predetermined magnitude, the relay opens to interrupt the auxiliary exciter shunt field energizing circuit. It has been found that relay contact corrosion increases the contact resistance of the electromechanical relay to a point which will not permit proper alternator buildup. Consequently, an alternator static buildup circuit which eliminates this problem is desirable.

It is, therefore, an object of this invention to provide an improved alternator static buildup circuit.

It is another object of this invention to provide an improved alternator static buildup circuit employing only solid-state components.

In accordance with this invention, an alternator static buildup circuit is provided wherein the potential of a rectified phase of the alternator is applied across the control and one current-carrying electrode of a transistor and across the exciter shunt field through the current-carrying electrodes of the transistor which is triggered conductive by the output potential of the generator to complete an auxiliary energizing circuit for the exciter shunt field and which is extinguished by a potential-sensitive bilateral switch connected in shunt with the control and a selected one of the current-carrying electrode thereof which goes conductive when the alternator output potential reaches a predetermined magnitude.

For a better understanding of the present invention, together with additional objects, advantages, and features thereof, reference is made to the following description and accompanying single FIGURE drawing which sets forth the solid-state alternator static buildup circuit of this invention in schematic form.

Referring to the drawing, the novel solid-state alternator static buildup circuit of this invention is set forth in schematic form in combination with an electric alternator 5 having output windings 5a, 5b, and 5c, and an exciter shunt field winding 6. In the interest of reducing drawing complexity, only the alternator output windings and associated exciter shunt field winding are shown in the FIGURE. It is to be specifically understood, however, that the novel static buildup circuit of this invention may be used with alternators of more or less phases.

The voltage regulator 8 may be any one of several well known in the art and, since it forms no part of this invention, has been indicated in block form.

Briefly, the solid-state alternator static buildup circuit of this invention comprises a rectifier circuit 25 having input and output circuitry for rectifying the output potential of at least one phase of alternator 5, at least one switching transistor having a control electrode and two current-carrying electrodes, may be type-NPN transistor 10 having a base electrode 11, a collector electrode 12 and an emitter electrode 13, and a potential-sensitive electric switch 15 of the type having normally open current-carrying elements electrically operable to an electric closing condition with an applied potential of a predetermined magnitude.

Rectifier circuit 25 includes a coupling transformer 26 having a primary winding 27 and a center-tapped secondary winding 28, two diodes 29 and 30 connected in a full wave rectifying relationship with secondary winding 28 and center tap 33, and output circuit means which may be output terminals 31 and 32 or any other electrical device or lead suitable for connection to external circuitry. The rectified potential appearing across output circuit terminals 31 and 32 is of a positive polarity upon output terminal 31 with respect to output terminal 32.

The input circuitry of rectifier circuit 25, primary winding 27 of transformer 26 is connected across one phase of alternator 5 through leads 34, 35 and 36 and through leads 37, 38 and 39.

The exciter shunt field winding 6 of alternator 5 is connected in series with the current-carrying electrodes, collector electrode 12 and emitter electrode 13 of type-NPN switching transistor 10, across the output circuit terminals 31 and 32 of rectifier circuit 25 through lead 40, diode 41 and lead 42 through leads 43 and 44, the collector-emitter electrodes of switching transistor 10 and leads 45 and 46.

With many applications the output potential of an alternator building up on the residual magnetism of the exciter field iron may be of a magnitude too low to trigger a single switching transistor conductive. Consequently, to obtain the necessary gain which will trigger the switching transistor conductive with very low magnitudes of rectified alternator potential, it may be more desirable to use two transistors, each having a control electrode and two current-carrying electrodes, connected in Darlington pair, shown in he FIGURE as type-NPN transistors 10 and 20.

The series combination of resistors 50 and 51, the base electrode 21 and emitter electrode 23 of transistor 20 and the base electrode 11 and the emitter electrode 13 of switching transistor 10 is connected across output circuit terminals 31 and 32 of rectifier circuit 25 through lead 40 and through leads 45 and 46, respectively. As the base of electrode 21 of type-NPN transistor 20 is connected to the positive polarity output terminal 31 of rectifier circuit 25 and the emitter electrode 13 of switching transistor 10 is connected to the negative polarity output terminal 32 of rectifier circuit 25, the rectified alternator output potential is applied across the base-emitter electrodes of these two type-NPN transistors in the correct polarity relationship to produce base-emitter current flow therethrough. The collector electrode 22 of transistor 20 and the collector electrode 12 of switching transistor 10 is connected to the positive polarity output terminal 31 of rectifier circuit 25 through lead 40, diode 41, lead 42, exciter shunt field winding 6 and leads 43 and 44, consequently, type-NPN transistors 10 and 20 are interconnected with the output terminals 31 and 32 of rectifier circuit 25 in the proper polarity relationship to produce collector-emitter current flow therethrough.

Should only a single switching transistor be necessary, the series combination of resistors 50 and 51 and the base-emitter electrodes of the switching transistor would be connected across the output terminals 31 and 32 of rectifier circuit 25.

For proper operation of the circuit of this invention, the current-carrying elements of potential-sensitive electric switch 15 are connected across the control electrode and a selected one of the current-carrying electrodes of the switching transistor and the output potential of rectifier circuit 25 is applied to electric switch 15 for operating the current-carrying elements thereof to the electric closing condition when the output potential of rectifier circuit 25 reaches a predetermined magnitude.

The current-carrying elements of bilateral switch 15 are connected across junction 52 between series resistors 50 and 51 and the emitter electrode 13 of switching transistor 10 through leads 53 and 54 and through lead 55. Consequently, the current-carrying elements of bilateral switch 15 are connected across the control electrode 21 of transistor 20 and the emitter electrode 13 of transistor 10 through leads 53, 54 and 55. With only a switching transistor, the current-carrying elements of bilateral switch 15 would be connected across the base-emitter electrodes thereof.

The output potential of rectifier circuit 25 is applied to bilateral switch 15 through lead 40 and resistor 50 and leads 55, 45 and 46 to operate the current-carrying elements thereof to the electric circuit closing condition when the output potential of rectifier circuit 25 reaches a predetermined magnitude.

Upon startup, the residual magnetism in the exciter field iron produces a magnetic field which induces a potential in the exciter armature winding. This induced potential produces a flow of current through the exciter armature winding which, in turn, produces a magnetic field which induces a potential in output windings 5a, 5b and 5c of alternator 5.

The potential induced across windings 5a and 5c of alternator 5 is full wave rectified by rectifier circuit 25 and appears as direct current potential across output terminals 31 and 32 thereof which is of a positive polarity upon output terminal 31 with respect to output terminal 32.

This potential is applied across the base-emitter junctions of both-NPN transistors 10 and 20 in the correct polarity relationship to produce base-emitter current flow through a type-NPN transistor. Consequently, transistors 10 and 20 conduct through the collector-emitter electrodes thereof.

Conducting switching transistor 10 completes an auxiliary energizing circuit for exciter shunt field winding 6 across output terminals 31 and 32 of rectifier circuit 25 through a circuit previously described. Consequently, the alternator output potential produces an additional flow of current through the exciter shunt field winding which increases the strength of the magnetic field produced by the exciter field which, in turn, aids in the buildup of alternator output potential across output windings 5a, 5b, and 5c.

When the output potential of alternator 5 reaches a predetermined magnitude, bilateral switch 15 conducts through the current-carrying elements thereof to short circuit both transistors 10 and 20. Consequently, transistors 10 and 20 go not-conductive to interrupt the auxiliary energizing circuit for exciter shunt field 15 and generating system operates in the normal manner.

Capacitor 60 is a filter capacitor which smooths the output potential of rectifier circuit 25, diode 41 is a blocking diode which isolates the voltage regulator circuit from the generator static buildup circuit of this invention and the series combination of resistor 61 and capacitor 62, connected across the collector-emitter electrode of transistor 10 provides surge protection for transistor 10.

While specific electrical elements and polarities have been set forth in this specification, it is to be specifically understood that alternate electrical elements having similar electrical characteristics and compatible polarities may be employed without departing from the spirit of the invention.

What is claimed is:

1. An alternator static buildup circuit comprising in combination with an electric alternator having at least an exciter shunt field, a rectifier circuit having output circuit means for rectifying the output potential of at least one phase of said alternator, at least one switching transistor having a control electrode and two current-carrying electrodes, means for connecting said shunt field of said alternator in series with said current-carrying electrodes of said transistor across said output circuit means of said rectifier circuit, means for connecting said control electrode and a selected one of said current-carrying electrodes of said transistor across said output circuit means of said rectifier circuit, a potential-sensitive electric switch of the type having normally open current-carrying elements electrically operable to an electric circuit closing condition with an applied potential of a predetermined magnitude, means for connecting said current-carrying elements of said electric switch across said control and a selected one said current-carrying electrode of said transistor, and means for applying the output potential of said rectifier circuit to said electric switch for operating said current-carrying elements thereof to the electric circuit closing condition when the output potential of said rectifier circuit reaches a predetermined magnitude.

2. An alternator static buildup circuit comprising in combination with an electric alternator having at least an exciter shunt field, a rectifier circuit having output circuit means for rectifying the output potential of at least one phase of said alternator, first and second transistors each having a control electrode and two current-carrying electrodes, means for connecting said shunt field of said alternator in series with said current-carrying electrodes of said second transistor across said output circuit means of said rectifier circuit, means for connecting said control electrode and a selected one of said current-carrying electrodes of both said transistors in series across said output circuit means of said rectifier circuit, means for connecting the other one of said current-carrying electrodes of said first transistor to the other one of said current-carrying electrodes of said second transistor, a potential-sensitive electric switch of the type having normally open current-carrying elements electrically operable to an electric circuit closing condition with an applied potential of a predetermined magnitude, means for connecting said current-carrying elements of said electric switch across said control electrode of said first transistor and the selected one said current-carrying electrode of said second transistor, and means for applying the output potential of said rectifier circuit to said electric switch for operating said current-carrying elements thereof to the electric circuit closing condition when the output potential of said rectifier circuit reaches a predetermined magnitude.

3. An alternator static buildup circuit comprising in combination with an electric alternator having at least an exciter shunt field and output circuitry, a rectifier circuit having input and output circuit means, means for connecting said input circuit means of said rectifier circuit across at least one phase of said alternator output, at least one switching transistor having base, collector, and emitter electrodes, first and second resistors, means for connecting said shunt field of said alternator in series with said collector-emitter electrodes of said transistor across said output circuit means of said rectifier circuit, means for connecting the series combination of said first and second resistors and said base-emitter electrodes of said transistor in series across said output circuit means of said rectifier circuit, a bilateral switch of the type having normally open current-carrying elements electrically operable to an electric circuit closing condition with an applied potential of a predetermined magnitude, and means for connecting said current-carrying elements of said bilateral switch across the junction between said first and second resistors and said emitter electrode of said transistor.

4. An alternator static buildup circuit comprising in combination with an electric alternator having at least an exciter shunt field and output circuitry, a rectifier circuit having input and output circuit means, means for connecting said input circuit means of said rectifier circuit across at least one phase of said alternator output, first and second transistors each having base, collector, and emitter electrodes, first and second resistors, means for connecting said shunt field of said alternator in series with said collector-emitter electrodes of said second transistor across said output circuit means of said rectifier circuit, means for connecting the series combination of said first and second resistors and said base-emitter electrodes of both said transistors in series across said output circuit means of said rectifier circuit, means for connecting said collector electrode of said first transistor to said collector electrode of said second transistor, a bilateral switch of the type having normally open current-carrying elements electrically operable to an electric circuit closing condition with an applied potential of a predetermined magnitude, and means for connecting said current-carrying elements of said bilateral switch across the junction between said first and second resistors and said emitter electrode of said second transistor.